(12) United States Patent
Feng et al.

(10) Patent No.: US 12,088,560 B2
(45) Date of Patent: *Sep. 10, 2024

(54) NETWORK CONTEXT MONITORING WITHIN SERVICE MESH CONTAINERIZATION ENVIRONMENT

(71) Applicant: SUSE LLC, Provo, UT (US)

(72) Inventors: Yuncong Feng, Fremont, CA (US); Gang Duan, San Jose, CA (US)

(73) Assignee: SUSE LLC, Pleasant Grove, UT (US)

( * ) Notice: Subject to any disclaimer, the term of this patent is extended or adjusted under 35 U.S.C. 154(b) by 440 days.

This patent is subject to a terminal disclaimer.

(21) Appl. No.: 17/371,733

(22) Filed: Jul. 9, 2021

(65) Prior Publication Data

US 2021/0336936 A1    Oct. 28, 2021

Related U.S. Application Data

(63) Continuation of application No. 16/265,850, filed on Feb. 1, 2019, now Pat. No. 11,075,884.

(51) Int. Cl.
| | | |
|---|---|---|
| *H04L 9/40* | (2022.01) | |
| *H04L 45/74* | (2022.01) | |
| *H04L 67/01* | (2022.01) | |
| *H04L 67/56* | (2022.01) | |
| *H04L 69/22* | (2022.01) | |

(52) U.S. Cl.
CPC .......... *H04L 63/0281* (2013.01); *H04L 45/74* (2013.01); *H04L 63/0263* (2013.01); *H04L 67/01* (2022.05); *H04L 67/56* (2022.05); *H04L 69/22* (2013.01)

(58) Field of Classification Search
CPC ..... H04L 63/0281; H04L 67/01; H04L 67/56; H04L 45/74; H04L 63/0263; H04L 69/22
See application file for complete search history.

(56) References Cited

U.S. PATENT DOCUMENTS

| | | | |
|---|---|---|---|
| 11,457,080 B1 * | 9/2022 | Meduri | .................. H04L 67/60 |
| 2016/0164832 A1 | 6/2016 | Bellagamba et al. | |
| 2019/0272205 A1 | 9/2019 | Jiang et al. | |
| 2020/0177549 A1 * | 6/2020 | Barton | .................... H04L 41/40 |
| 2020/0220848 A1 * | 7/2020 | Patwardhan | .......... H04L 63/061 |
| 2020/0236055 A1 * | 7/2020 | Warnicke | .............. H04L 69/163 |

\* cited by examiner

Primary Examiner — Techane Gergiso

(57) ABSTRACT

A security monitor monitors network communications at a loopback interface of a pod in the container system. The pod includes a service mesh proxy and an application container. The application container includes computer-readable instructions and is initiated via a container service and is isolated using operating system-level virtualization. The application container communicates with the service mesh proxy using the loopback interface. The security monitor extracts network address and port information from packet data in the network communications at the loopback interface. The security monitor determines one or more connection contexts of the network communications at the loopback interface, each connection context used to identify a network session of the application container with a remote application container.

20 Claims, 5 Drawing Sheets

400

```
┌─────────────────────────────────────────────────────────────────────┐
│ Monitor network communications at a loopback interface of a pod in  │
│ the container system, with the pod including a service mesh proxy   │
│ and an application container                                        │
│                              410                                    │
└─────────────────────────────────────────────────────────────────────┘
                                  │
                                  ▼
┌─────────────────────────────────────────────────────────────────────┐
│ Extract network address and port information from packet data in    │
│ the network communications at the loopback interface                │
│                              420                                    │
└─────────────────────────────────────────────────────────────────────┘
                                  │
                                  ▼
┌─────────────────────────────────────────────────────────────────────┐
│ Determine one or more connection contexts of the network            │
│ communications at the loopback interface, with each connection      │
│ context used to identify a network session of the application       │
│ container with a remote application container                       │
│                              430                                    │
└─────────────────────────────────────────────────────────────────────┘
```

FIG. 4

NETWORK CONTEXT MONITORING WITHIN SERVICE MESH CONTAINERIZATION ENVIRONMENT

CROSS REFERENCE TO RELATED APPLICATIONS

This application is a continuation of U.S. application Ser. No. 16/265,850 filed on Feb. 1, 2019, which is incorporated by reference in its entirety.

FIELD OF ART

The disclosure generally relates to the field of containerization security, and specifically to network context monitoring within a service mesh environment with service mesh proxy for each pod in a container environment.

BACKGROUND

A recent development in networked infrastructure is the container model. In the container model, a kernel of an operating system (e.g., Linux) allows for multiple isolated user-space instances, or "containers," executing simultaneously. Each container is isolated from other containers, and may access a set of resources that are isolated from other containers. Each container also interacts with a container service, which may provide various functions, such as an application programming interface (API) to allow each container to access various functions of the container service (e.g., establishing communications, communicating with other containers, logging). One advantage of such a container system is the ability of the container system, with the assistance of the container service, to quickly and transparently migrate containers between hosts during live operation, e.g., for load balancing. Another advantage is that, since virtual emulation of resources, such as in a virtual machine (VM) environment, is not being performed to provide resources to the containers, the overhead compared to a VM-based environment is much lower.

In addition, such container system may be configured to use a service mesh infrastructure. A service mesh enhances communications between various services provided by application containers. The service mesh may provide services such as service discovery, load balancing, encryption, authentication, and so on. To implement the service mesh, each application container may be paired with a service mesh proxy, which acts as a gateway to any communications, either ingress or egress, to the application container. The service mesh proxy (which may also be known as a sidecar), handles communications between application containers and performs other operations to allow for the functions of the service mesh. The separation of the application container from the functions of the service mesh allow an application container to be generally agnostic of the service mesh infrastructure layer. However, the introduction of the service mesh proxy introduces significant challenges to the monitoring of communications between services or application containers. The service mesh proxy, being a proxy, changes the network addresses and ports of packets to/from a connected application container, and may modify the packets further, such as by encrypting the packet payload. Thus, monitoring the network address and port information of packet data to/from an application container may no longer reveal the proper destination and source of the packet data. Therefore, it becomes difficult to determine whether packet data at one application container is related to the same connection as packet data monitored at another application container. Hence, what is lacking is a system for monitoring container network traffic within a service mesh infrastructure in order to determine the relationship of network packets.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

Figure (FIG. 1 illustrates a system with a security monitor to monitor a loopback interface between a service mesh proxy and an application container for ingress connections in a container environment, according to an example embodiment.

FIG. 4 is a flow chart illustrating an exemplary method for generating a network security policy for an application container using application configuration information and dynamic services information, according to one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embodiments herein describe a security monitor to monitor network communications at a loopback interface of a pod in the container system. The pod includes a service mesh proxy and an application container. The application container includes computer-readable instructions and is initiated via a container service and is isolated using operating system-level virtualization. The application container communicates with the service mesh proxy using the loopback interface. The security monitor extracts network address and port information from packet data in the network communications at the loopback interface. The security monitor determines one or more connection contexts of the network communications at the loopback interface, each connection context used to identify a network session of the application container with a remote application container.

Example System for Monitoring Application Containers within a Service Mesh

Figure 1:
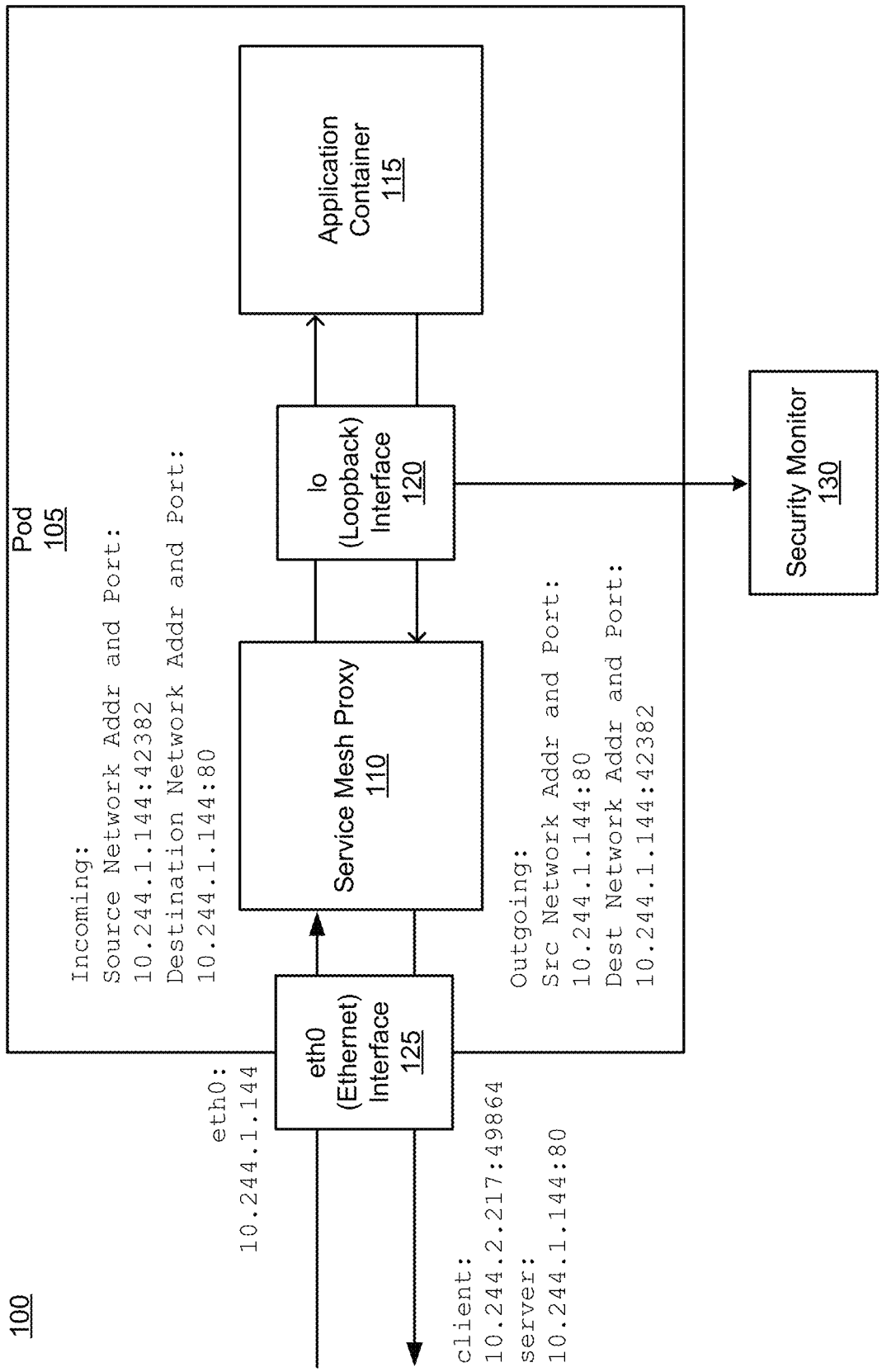

FIG. 1 illustrates a system 100 with a security monitor to monitor a loopback interface between a service mesh proxy and an application container for ingress connections in a container system, according to an example embodiment. The system 100 includes a pod 105, service mesh proxy 110, an application container 115, a loopback interface 120, an ethernet interface 120, and a security monitor 130. Some of the elements of the container system are omitted here for sake of clarity. However, additional details regarding the container system are described below with reference to FIG. 3.

An application container, such as application container 115, is an instance of a user-space process executing on a resource isolated instance within an OS. The application containers execute in an operating system (OS) level virtualization environment whereby the application containers execute on a shared set of resources of a host. Each application container 115 has access to a set of isolated resources, but does not have direct access to the actual physical resources of the underlying hardware of the host. These physical resources may include a CPU, I/O devices, network devices, memory, physical storage, and so on. The isolated resources are not emulated, as would be the case with resources within a virtual machine, but are rather presented to the app container as a portion of the physical resources, with the remainder of the physical resources hidden from the application container 115.

The service mesh proxy 110 allows for the application containers to operate in a service mesh infrastructure. A service mesh infrastructure (or "service mesh") provides various additional features for the application containers, such as service discovery, load balancing, traffic throttling, traffic redirection, traffic shaping, encryption, authentication/authorization, and so on. Other features that may be enabled by a service mesh include support for a circuit breaker pattern, whereby faulty application containers may be isolated from the rest of the system. In order to enable such a service mesh, and perform features such as traffic redirection, each application container is paired with a service mesh proxy, such as service mesh proxy 110, which transparently translates (i.e., maps or converts) network addresses and ports for packets to and from the application container using one or more network address translation tables (e.g., iptables). Each packet may indicate within a header portion of the packet a source and destination network address, source and destination port number, and a network protocol. The iptables indicates, for incoming and outgoing network packets, a network address and/or port number for which to translate (i.e., map) the original network address and/or port number within the packet header to. When the service mesh proxy 110 processes a packet, the service mesh proxy 110 accesses the iptables and determines the appropriate network address and port for which to translate the network address and port of the packet according to the existing network address and/or port indicated within the packet. This translation allows the service mesh proxy 110 to redirect packet data to different network addresses and ports. The service mesh proxy 110 may translate packet data arriving at the ethernet interface 125 before sending the translated packet data to the loopback interface 120. The service mesh proxy 110 may also translate packet data received at the loopback interface 120 before sending the translated packet data to the ethernet interface 125. The service mesh proxy may also perform additional actions upon the packets in addition to the translation, such as encryption and decryption of the packets. Both the application container and the service mesh proxy execute within a pod, such as pod 105.

The pod 105 represents a group of application containers which share the same resources (e.g., network resources, storage resources). These resources may be physical resources or virtual resources. The application containers within each pod may also share the same namespace (e.g., Linux namespace), and may share the same network interfaces and network connections. The pod 105 represents application containers that are executing on the same logical host, and may be isolated from other pods via various operating system isolation features (e.g., cgroups, namespaces). The application containers within the pod 105 (or any pod), such as the service mesh proxy 110 and the application container 115, share the same Internet Protocol (IP) (i.e., network) address and port space. In addition, the application containers within a pod may communicate with each other using the localhost, i.e., the loopback interface 120. In one embodiment, the pod 105 may be a Kubernetes pod.

The loopback interface 120, otherwise known as localhost or lo, is a network interface of the pod 105. Any packet data from any application container within the pod 105 may be directed to the loopback interface 120, and this information may be received by other application containers within the pod 105. In one embodiment, the loopback interface 120 may be accessed using an IP address within the 127.0.0.0/8 IPv4 address block, with each pod 105 having a differently assigned IP address for the loopback interface 120.

The ethernet interface 125 represents a physical or virtual network interface of the pod at which packets directed or sent to the pod are received or transmitted. The ethernet interface 125 may also be known as eth0. Packets directed to the application container 115 may arrive at the pod 105 via the ethernet interface 125, and packets directed to other application containers or entities may exit the same ethernet interface 125. However, the packets at the ethernet interface 125 have network addresses and ports which have been modified by the service mesh proxy 110 due to the modification of the packets by the service mesh proxy 110, and therefore monitoring traffic between pods in the service mesh proxy does not allow a system to determine which packets belong to which sessions between application containers. In addition, as the packets may be encrypted by the service mesh proxy 110, their contents, beyond the packet headers, are also indiscernible.

Thus, instead of monitoring the application container at the ethernet interface, the system 100 described here includes a security monitor 130 to monitor packet data from the application container 115 at the loopback interface 120 via the security monitor 130. This allows the security monitor 130 to monitor the packet data of the application container 115 before it has been modified by the service mesh proxy 110, solving the problem of how to monitor packet data to determine network sessions and other information in a service mesh infrastructure environment.

The security monitor 130 is thus employed to monitor communications of the application container 115 at the loopback interface 120 in order to determine a connection context of packet data communicated between the service mesh proxy 110 and the application container 115, as this information cannot be determined by monitoring packet data at the ethernet interface 125 for the reasons described above. The connection context of the packet data indicates how different packet data in different packets are related to each other. In one embodiment, the connection context refers to the session to which the data in each packet belongs. Different packets may be determined by the security monitor 130 to belong to the same session if the packet indicates the same source network address, source port, protocol, destination network address, and/or destination port, as other packets of that session. This set of five values may also be known as a 5-tuple. Once the connection context is determined for one or more packets, the payload of each packet, i.e., the non-header data of the packet, can be combined or reconstructed to determine the data that the application container has been transmitting or receiving to determine whether that data may be suspicious and/or malicious from a security context.

Figure 2:
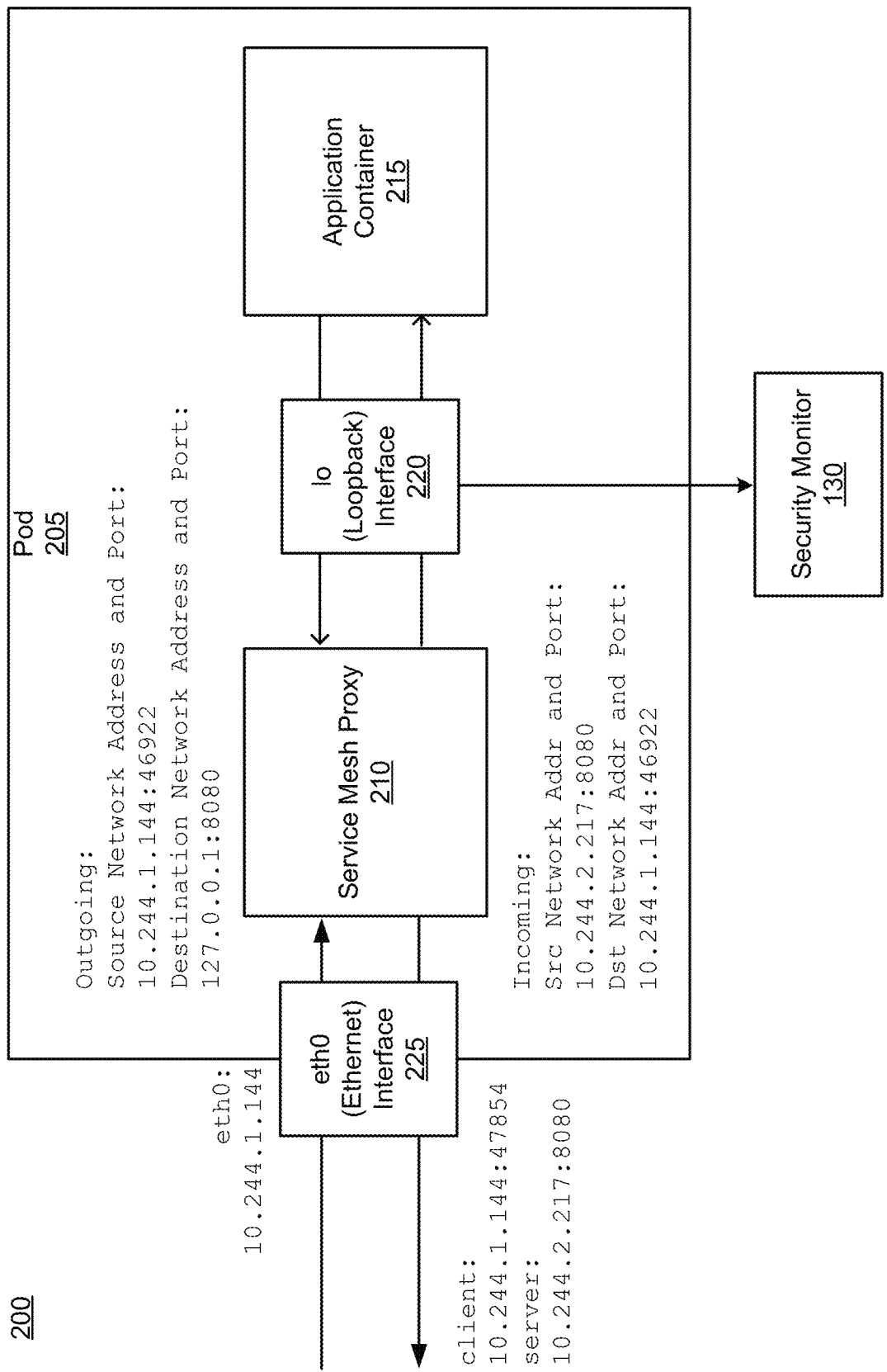
FIG. 2 illustrates a system with a security monitor to monitor a loopback interface between a service mesh proxy and an application container for egress connections in a container environment, according to an example embodiment.

The method with which the security monitor 130 determines the connection context of the packet differs based on whether the application workload (i.e., the function of the processes being executed in the application container 115) of the application container 115 is as a server or as a client. When the application container 115 acts as a server, it listens to, receives, and responds to requests from client application containers 115. When the application container 115 acts as a client, it sends requests to other application containers 115 and waits for responses from the recipient application container 115. When the application container 115 acts as a server, it is serving ingress connections. Conversely, when the application container 115 acts as a client, it is serving egress connections. FIG. 1 illustrates the method of determining connection context for ingress connections. FIG. 2, described below, illustrates the method of determining connection context for egress connections.

In the example shown in FIG. 1, the service mesh proxy receives packet data (which may be one or more packets) from the ethernet interface 125, which has a network address of 10.244.1.144. The packet data indicates a client with a network address of 10.244.2.217, from a port number of 49864. The packet data indicates a server or destination address of 10.244.1.144, the network address of the ethernet interface 125, on port 80 (the standard Hypertext Transfer Protocol or HTTP port). However, as noted above, the packet data at this stage may be encrypted, and thus reconstruction of the payload data would be impossible. Furthermore, due to the security of the service mesh infrastructure there may be no visibility into the service mesh proxy 110 such that decryption keys can be retrieved to decrypt the packet data which arrives at the ethernet interface 125. For example, the service mesh proxy 110 may exchange keys via SSL, and hence the keys would not be visible. Therefore, instead of monitoring the packet data at the ethernet interface 125, the security monitor 130 monitors the ingress connection packet data at the loopback interface 120.

In order to monitor the packet data at the loopback interface 120, the security monitor 130 may first switch to the namespace of the pod 105 (e.g., using a command such as "ip netns exec" in Linux). In addition, the security monitor 130 may open a socket to the loopback interface 120 in order to monitor packet data on that interface (e.g., using the Linux API command "socket( )" and "bind( )" to bind the socket to the loopback interface). The security monitor 130 may also switch back to its original namespace but retain the handle to the socket to receive packet copies for that socket (i.e., for packet data at the loopback interface 120). The security monitor 130 may perform this operation for all pods in the system. These pods and their namespaces may be determined by commands issued to a container service of the container system (e.g., "kubectl get pods—all-namespaces"). The security monitor 130 may need escalated privileges (e.g., root access) within the operating system of the container system in order to perform these operations.

Once the security monitor 130 is able to tap into the packet data communications between the unencrypted service mesh proxy 110 and the application container 115 via the loopback interface 120, the security monitor 130 may begin to determine the connection context of the packet data.

For ingress connections, the service mesh proxy 110 translates the client network address and port to the local network address (i.e., the localhost address) of the pod 105 and to a different port from the original port of the client indicated in the packet data incoming to the ethernet interface 125 (in addition to decrypting the packet data). Thus, for example, in FIG. 1, the client address of 10.244.2.217 is translated to the localhost address of 10.244.1.144 in the packet data incoming to the application container 115 (e.g., this data may include requests made by remote application containers or other entities to request information from the application container 115, such as a web page). In addition, the source port for the incoming packet data is also modified, from the original 49864 to 42382. The destination port and network address remains unchanged by the service mesh proxy 110. The application container responds to the incoming packet data with one or more outgoing packets of packet data, i.e., outgoing packet data. This packet data reverses the source and destination network address and port information from the incoming packet data. Therefore, the service mesh proxy 110 translated source network address and port from the incoming packet data (e.g., 10.244.1.144:42382 in FIG. 1) is now listed as the destination network address and port, while the source network address and port (e.g., 10.244.1.144:80 in FIG. 1) is now listed as the source network address and port in outgoing packet data.

The security monitor 130 captures these incoming and outgoing packets for the ingress connection and correlates different packets together by matching the source network address and port number of incoming packets with destination network address and ports of outgoing packets. The security monitor 130 determines that those incoming packets with source port numbers that match the destination port numbers of outgoing packets are of the same connection context, i.e., part of the same session, as those outgoing packets. This is because for each session with a particular client, the service mesh proxy will utilize the same translated port number for all packet data for that session. The security monitor 130 may unpack these packets and extract their payload (e.g., by extracting binary data from the packets offset by the address of the payload). The security monitor 130 may further reconstruct the incoming and outgoing data streams by concatenating the payload data from multiple packets together according to an ascending order of sequence numbers indicated in each packet.

At this point, the security monitor 130 may correlate packets with each other and with the server application container 115, but cannot yet correlate the packets with the actual client which initiated the request to the application container 115, as the network address has been removed from the packet headers of the packet data due to the translation by the service mesh proxy 110. However, the security monitor 130 may be able to identify the client once the packet data from the corresponding client has been found and reconstructed, as described below with reference to FIG. 2. After the security monitor 130 determines the connection context of sets of packet data intercepted at the loopback interface 120, i.e., the security monitor 130 determines which groups of packets in the packet data are related to the same connection context, the security monitor 130 may report the reconstructed packet data, or the raw packet data, and the associated connection context of the packet data, to a separate security layer for further analysis and reporting. In another embodiment, the security monitor 130 may generate a report with the packet data and connection context and present this information in a user interface to an owner of the application container 115 or an administrator. This user interface may be presented by a user interface container, as described with further detail below with regards to FIG. 3.

FIG. 2 illustrates a system 200 with a security monitor to monitor a loopback interface between a service mesh proxy and an application container for egress connections in a container system, according to an example embodiment. The system 200 includes a pod 205, service mesh proxy 210, an application container 215, a loopback interface 220, an ethernet interface 220, and the security monitor 130. Some of the elements of the container system are omitted here for sake of clarity. However, additional details regarding the container system are described below with reference to FIG. 3.

The pod 205, service mesh proxy 210, application container 215, loopback interface 220, and ethernet interface 225 may be similar to the pod 105, service mesh proxy 110, application container 115, loopback interface 120, and ethernet interface 125 of FIG. 1. However, instead of processing ingress connections as in FIG. 1, the pod 205 processes egress connections, i.e., the application container 215 has an application workload of a client, i.e., it sends requests out to server systems (such as pod 105) to request data, upon which it receives responses. In contrast to a server workload, which has open ports or sockets to listen to requests, a client workload does not necessarily have open ports, but opens ports or sockets to communicate with a server or other entity on demand. Thus, the service mesh proxy 210 may have a different set of iptables rules for processing packet data communication and translating network addresses and ports in packet data that is transmitted by the application container 215 or received by the pod 205.

As shown, the application container 215 may transmit a request to a server. In the example in FIG. 2, the server has a network address of 10.244.2.217, and the port to which the request is made is port 8080. The request from the application container 215 may initially include the network address and port number of the server. However, these may be modified by iptables rules and converted to the network address of the loopback interface, i.e., 127.0.0.1. Thus, the loopback interface network address of 127.0.0.1 is indicated in this outgoing packet data as the network address for the destination. The port number of the packet data in the request may also be changed to a port number which the service mesh proxy 210 is listening to. The source network address for that packet data is that of the pod 205 and therefore the application container 215 (e.g., 10.244.1.144). The port number for the source is a unique port number for the particular session, and may be selected by the application container 215 (e.g., at random from a range of port numbers). Once the request is received by the service mesh proxy 210 at the loopback interface 220, the service mesh proxy 210 can translate the destination network address and port number to the actual network address and port number of the remote server using operating system API tools, as well as perform other operations on the packet data, such as encrypting it. The service mesh proxy 210 sends the packet data with the translated destination network address to the ethernet interface 225, where it is transmitted to the server via a network (e.g., a local network or external network).

Subsequently, a response to the request may be received from the server and arrives at the ethernet interface 225. The service mesh proxy 210 receives the packet data from the response and may decrypt it, and sends it to the application container 215 via the loopback interface 220. The application container 215 monitors for the response via the loopback interface 220, as it had made the initial request to the loopback interface 220. The source network address and port number indicated in the packet headers for this incoming packet data at the loopback interface 220 includes the actual network address of the server, e.g., 10.244.2.217 in FIG. 2, as well as the port number of the server, which matches the port number of the destination port indicated in the outgoing packet data. The destination network address and port match that of the source network address and port of the original request, i.e., the outgoing packet data.

Thus, the security monitor 130, upon tapping the loopback interface 220 (e.g., by changing namespace and opening a socket to the loopback interface 220 as described above), may monitor and record the outgoing and incoming packet data and record the source and destination network addresses and port numbers in the packet data. The security monitor 130 matches the source network address and port numbers indicated in outgoing packet data to destination network address and port numbers indicated in incoming packet data. If the security monitor 130 finds a match between these numbers in a set of (outgoing and incoming) packet data, then the security monitor 130 can determine that this set of outgoing and incoming packet data belongs to the same connection context. Furthermore, the security monitor 130 can further determine, using the source network address and port number of the incoming packet data in this set packet data the identity of the server to which the application container 215 is making requests, as the source network address identifies the actual network address of the server, since the service mesh proxy 210 does not translate this value for the incoming packet data of the egress connection.

Once the connection context is determined for a set of packet data, the security monitor 130 may extract the payload, reconstruct it, and/or report the connection, connection context, raw payload data, and/or the reconstructed payload as described above for the ingress connection. In addition, the security monitor 130 may correlate the reconstructed payload data with corresponding reconstructed payload data among the collected reconstructed payload data for ingress connections in other pods in the container system. If a match is found, the security monitor 130 may determine that the packet data for that particular ingress connection with the matching reconstructed payload data is part of the same connection context as the packet data for the egress connection. This allows the security monitor 130 to correlate ingress connections with clients, even though, as described above, ingress connections, when monitored at the loopback interface 120, do not indicate the network address of the client.

In order to determine whether a connection is an ingress or egress connection, the security monitor 130 may determine whether the incoming and outgoing packet data for an application container matches one of the patterns described above. If the destination network address and source network address of incoming and outgoing packet data, respectively, are the same (and/or match the network address of the ethernet interface), the security monitor 130 may determine that the packet data is related to an ingress connection.

Otherwise, if the destination network address of outgoing packet data is the loopback address, and/or the source network address of incoming packet data does not indicate the network address of the ethernet interface, the security monitor 130 may determine that the packet data is part of an egress connection.

Additionally, in order to determine that an application container is coupled to a service mesh proxy, the security monitor 130 may monitor the ethernet interface and loopback interface of pods to determine if the pattern of network address translation described above exists. The security monitor 130 may monitor the manifest information for pods and/or search among running processes to determine if a service mesh proxy is enabled. If a service mesh proxy is detected, the security monitor 130 may being the monitoring process described above.

Although in the above description reference was made primarily to matching port number and network addresses, the security monitor 130 may also additionally match the protocol indicated in the packet data between incoming and outgoing packet data as an additional check to determine if the incoming and outgoing packet data are part of the same connection context.

Although the description above has been made with reference to a service mesh proxy within a container environment, the method described above can be applied to any system in which a proxy may encrypt or otherwise modify packet data originating or directed to a separate process or entity, such as a virtual machine, server, application process, etc.

Although the security monitor 130 is described as being external to the pod 105, in other embodiments the security monitor 130 is an executable process that may be installed by an owner of the pod 105, or in the case where the process here is applied to a non-container system, the executable process may be installed to a location which may access communications between the proxy and the application process.

Example Container Architecture

Figure 3:
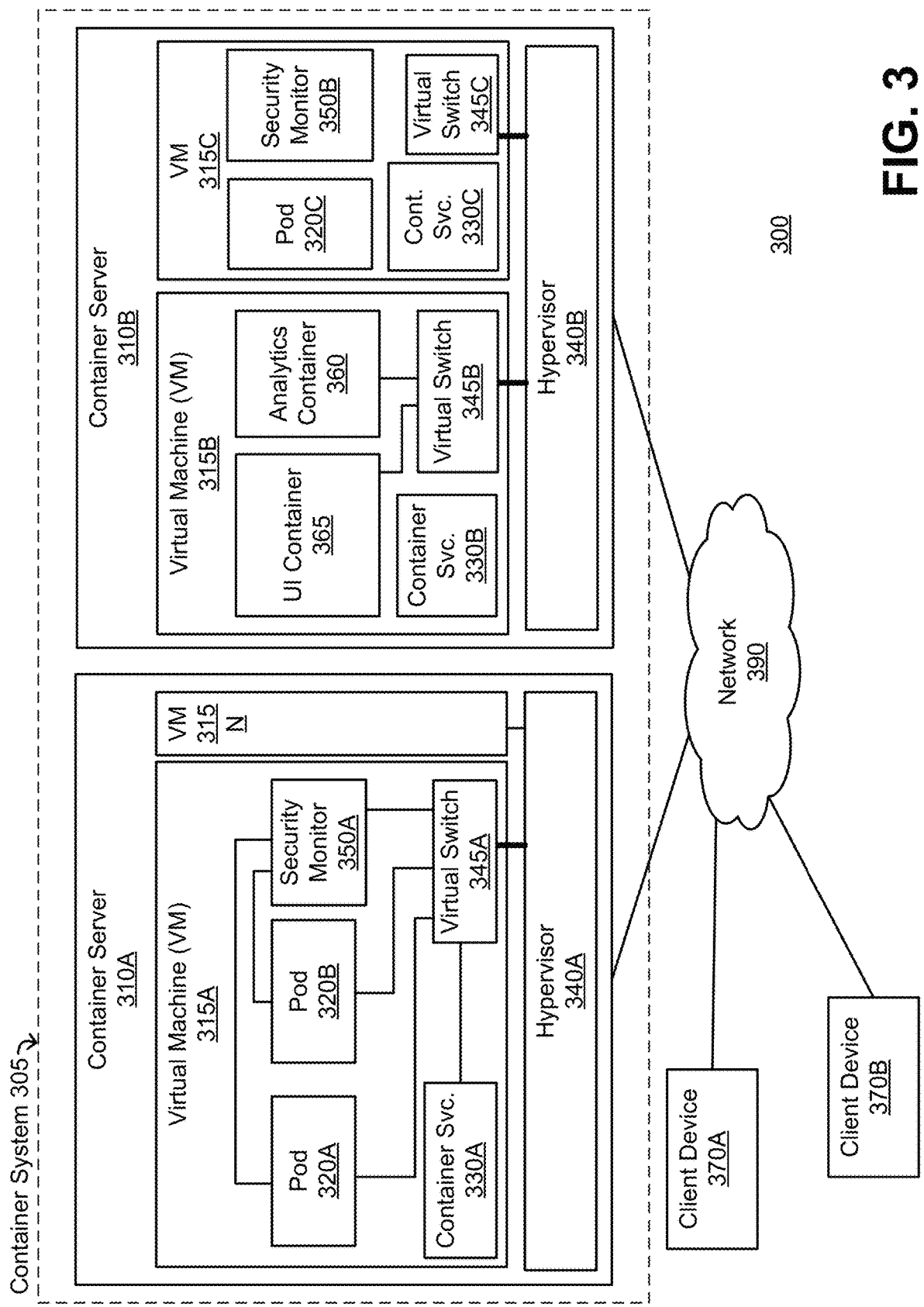
FIG. 3 illustrates an example system with an exemplary container architecture in which the security monitor may operate, according to an embodiment.

FIG. 3 illustrates an example system 300 with an exemplary container architecture in which the security monitor 130 of system 100 and system 200 may operate, according to an embodiment. The system 300 includes the network 390, one or more client devices 370, one or more container servers, e.g., 310A, 310B (generally, 310) of a container system 305, with each container server 310 including one or more pods, e.g., 320A, 320B (generally 320). A container server 310 also may include a security container 350, a management container 355, an analytics container 360, and/or a user interface (UI) container 365. Although the two illustrated container servers 310A and 310B include different pods, this is not meant to indicate that the container servers 310A and 310B are different. The pods within each container server 310 may be interchangeable, and thus each container server 310 may be the same. Although the illustrated system 300 may include the elements shown in FIG. 3, in other embodiments the system 300 may include different elements. Furthermore, the functionalities of each element may be distributed differently among the elements in other embodiments.

The network 390, which can be wired, wireless, or a combination thereof, enables communications among the client devices 370 and the one or more container servers 310 of the container system 305 and may include the Internet, a local area network (LAN), virtual LAN (VLAN) (e.g., with VPN), wide area network (WAN), or other network. In one embodiment, the network 390 uses standard communications technologies and/or protocols, such as Hypertext transfer Protocol (HTTP), Transmission Control Protocol/Internet Protocol (TCP/IP), Uniform Resource Locators (URLs), and the Doman Name System (DNS). In another embodiment, the entities can use custom and/or dedicated data communications technologies instead of, or in addition to, the ones described above.

The client devices 370 are electronic devices used by users to perform functions such as consuming digital content, executing software applications, browsing websites hosted by web servers on the network 390, downloading files, and interacting with the container servers 310. For example, the client devices 370 may be dedicated e-readers, smartphones, wearables (e.g., smartwatches or pendants), or tablets, laptops, or desktop computers configured similar to an exemplary machine (or computing system) described with FIG. 5. A client device 370 may include one or more applications, such as a web browser, to interact with services provided by the container servers 310. Although two client devices 370 are illustrated in FIG. 3, in other embodiments the environment 300 includes more client devices 370.

The container servers 310 are electronic devices that communicate via network 390 and may execute hypervisors, virtual machines (VMs), and one or more pods or containers. Each container server 310 may be located at a different physical location than another container server 310. However, the container servers 310 may communicate with each other via dedicated network links, such as a tunnel. This may allow services on each container server, such as the container services 330, to communicate with each other within a virtual local network. In one embodiment, the container servers 310 include an operating system that enables operating-system-level virtualization, such that the kernel of the operating system allows for multiple isolated user-space instances (i.e., "containers"). These containers may be grouped into pods, as described above. In one embodiment, the container servers 310 include an operating system that enables hardware virtualization, which is a method of simulating or emulating a separate set of hardware resources on which a guest operating system or other software to executes. In such a case, the container server 310 may include one or more hypervisors 340 for hardware virtualization, on which one or more virtual machines (VMs) 315 execute. In another embodiment, one or more VMs 315 may be represented by the host 150.

The hypervisor 340 is a software and/or hardware component executing on the container server 310 that creates and runs the VMs 315. The hypervisor 340 may execute directly on the hardware (e.g., processor, memory, storage, etc.) of the container server 310, may execute on an operating system of the container server 310, or may execute using a hybrid of these two (e.g., in the case of a Kernel-based Virtual Machine (KVM)). The ability to execute multiple VMs on a single hardware platform expands the capabilities of the hardware platform and simplifies management, while improving security. Furthermore, multiple different operating system versions and platforms may execute on each VM, while all using the same hardware platform.

The VMs 315 are emulations of a computer system or hardware platform. Each VM 315 emulates, either fully or partially, a set of hardware resources for a computer system. For example, the VM 315 may emulate a processor, memory, storage, graphics adapter, interrupts, and so on. Although the emulation may increase the resources needed to execute a task, and may lower efficiency, as noted, the VM 315 provides other benefits, such as the execution of multiple operating system versions and high availability, among other features.

Each VM 315 may execute an operating system that supports a container environment. As used here, container environment refers to the system upon which the containers are executing. In the illustrated example, the container environment is the VM 315 and operating system executing on the VM 315. However, in other cases, the container environment may be a physical system such as the container server 310 itself and the operating system executing on that container server 310.

As noted, an operating system may support a container environment by having a kernel that has enabled operating-system-level virtualization for multiple isolated containers, along with additional resource management features, which limit the resources allocated to each isolated container. For example, for each container executing within the operating system, a kernel may limit the amount of resources (e.g., memory, processor cycles) provided to that container through the use of various resource management components of the operating system (e.g., thread priority, memory allocation, etc.).

In one embodiment, the kernel may be a Linux kernel, and may support resource isolation features such as chroot, cgroups, kernel namespaces, and union-capable file systems (e.g., aufs) in order to isolate each container. These features restrict each container's view of the operating system's resources. Instead, each app container may only see a set of virtual resources. For example, an pod 320 may only be able to view file systems that are authorized for that pod 320. In one embodiment, the kernel may be a FreeBSD kernel, and the operating-system-level virtualization functions may be implemented in a "jail" system call. Compared to virtual machines, operating-system-level virtualization does not incur an emulation overhead, do not require a separate disk image for each container, are more resource-efficient as dedicated resources do not need to be allocated per container, may be more efficiently threaded, and so on. However, the container may still execute within a VM. Although the container environment is described here as executing within a VM 315, in another embodiment the container environment executes directly on the hardware of the container server 310.

In one embodiment, the container server includes the virtual switch 335 to emulate a hardware switch in software. Although the virtual switch 335 is shown to execute within the VMs 315, in other embodiments the virtual switch 335 executes within the hypervisor 340. In a packet-switched environment, a hardware switch receives packets with an indicated destination network address and routes these packets to an output port which is connected to a path on which the destination with the destination network address exists. The hardware switch also may support various management interfaces and protocols (e.g., quality of service (QoS). Similarly, the virtual switch 335 may provide functions that are similar to the above-described hardware switch, but instead of being implemented in hardware, the virtual switch 335 may be implemented in software (or in a hybrid software/hardware implementation). For example, the virtual switch 335 may route communications arriving at the container server 310 or VM 315 to the correct container or other service within the container server 310 or VM 315. As another example, the virtual switch 335 may route communications between containers of the same container server 310 or VM 315. The virtual switch 335 performs the routing using the network addresses of each container executing within the container server 310. While the virtual switch 335 is shown to be part of the VM 315 in the illustrated embodiment, in another embodiment the virtual switch 335 may be part of the hypervisor 340 or the VM 315 and the hypervisor 340 may each have a virtual switch.

The container service 330 is a collection of services to assist with the deployment and execution of containers on the VMs 315. Although two container services 330A and 330B are illustrated, they perform similar functions and are described together here. The container service 330 may include an application programming interface (API) for the use of software developers creating containerized software. The API may allow a software developer to easily create a containerized software application without having to implement operating system and operating system version specific functions, which are instead implemented by the container service 330. For example, the container service 330 may offer API function calls that may be used by a container to perform certain functions related to creating a container. The container service 330 may manage the isolation of resources for each container. These resources may include filesystem resources (e.g., system libraries), user and user groups, process trees (e.g., viewable processes), network resources, device resources, and inter-process communication resources (e.g., semaphores). The container service 330 may perform the isolation through the use of permissions restrictions, disk quotas, central processor unit (CPU) scheduling, input/output (I/O) scheduling, counters (e.g., beancounters), and so on.

The API of the container service 330 also may include functions to allow for a software developer to easily deploy containers on multiple hardware platforms in a distributed fashion, and for each container to be able to share data with other containers in a seamless fashion. For example, the container service 330 may allow one container to be able to access a same shared pool of data as another container through a standard API, without the need to manage the memory space directly.

The container service 330 also may be able to combine multiple container servers 310 or other hardware platforms into a single virtual host (e.g., a clustered host). The container service 330 also may include extensions to allow for easy integration with cloud services providers, such that a software developer may easily deploy a containerized application to one of these cloud services. In addition, the container service 330 may provide orchestration functions for configuration a service mesh infrastructure for the container system 305. Examples of container services include Docker®, Kubernetes®, and so on.

After receiving a request from an application container within a pod 320 (e.g., via the API), the container service 330 may also create a connection between the pod 320 and the virtual switch 335. This connection includes a port pair, with one port connected to the virtual switch 335, and the other pair connected to the pod 320. This connection also may include the network hardware layer address (e.g., media access control (MAC) address) and network address (e.g., Internet Protocol (IP) address) for the pod 320. This information provides the pod 320 with its own network address and isolated network path. The connection may be used by the pod 320 to route to other containers or destinations that are connected to network 390. The container service 330 also may provide the connection as a tunneled connection.

The pod 320 is a containerized software application executing in the container system 305, and may be similar to the pods described above. In the illustrated embodiment of FIG. 3, the pod 320 is executing in the VM 315. However, in other embodiments, the pod 320 may execute directly on the container server 310 (via the operating system level virtualization of the container system 315) and not within a VM. Although two pods 320A-B are shown here, in other embodiments each VM 315 (or container server 310) may have multiple app containers. The pod 320 may include any executable code as created by a software developer. The pod 320 may include a network interface to communicate with other entities in the network 390 via the virtual switch 335. As described above, each pod 320 may be isolated from other pods 320. Each pod 320 may thus be in its own "domain." As noted, these domains may be created using different method of operating-system-level virtualization, such as through the use of namespaces (e.g., Linux namespaces). In addition, each pod 320 may include one or more application containers grouped within.

In one example embodiment, the application containers grouped within a pod 320 may be stored as one or more images that include the executable code and other data for the containerized software application of the application container. Each image may include updates and changes to the software application. These images may be part of a union file system, and may be joined together by the container service 330, along with a base image, in order to generate the complete application package. The running application container comprises this complete application package. An additional read-write layer also may be added by the container service 330, as the images are read only.

The security monitor 350 may perform functions similar to the security monitor 130 of FIGS. 1-2. As described above, the security monitor 350 may present the collected information in a report. This report may be sent to the UI container 365 to be presented in a user interface to the owner of an application container or administrator of the container system 305. The security monitor 350 may also submit the collected information to the analytics container 360 to determine if any undesired or malicious activity is occurring based on an analysis of the data. Each VM 315 may include a separate security monitor 350 to monitor the pods executing on that VM 315.

The container system 305, in one embodiment, also includes one or more analytics containers 360 to analyze information received from the security monitor 350. The analytics container 360 may request or receive longs and statistics from the security monitor 350 regarding intercepted network traffic and other data. The analytics container 360 may analyze this information to produce various results. The analytics container 360 may also forward the information and analytical results to the management container 355.

The container system 305, in one embodiment, also includes a user interface (UI) container 365 to provide a user interface to a user. The UI container 365 may interface with a user using a graphical user interface (GUI) or a command line interface (CLI). As noted above, the UI container 365 communicates with the security monitor 350 and presents collected information regarding application containers executing on the container system 305 which use a service mesh proxy. The UI container 365 may also present other information, such as various analytical reports, statistics. If the interface is a GUI, the interface may be presented using various GUI elements, such as drop down menus, tables, and so on, and may be interfaced using interface devices such as a mouse and touchscreen.

Example Flows

FIG. 4 is a flow chart illustrating an exemplary method 400 for generating a network security policy for an application container using application configuration information and dynamic services information, according to one embodiment. In one embodiment, FIG. 4 attributes the steps of the method 400 to the security monitor 130. However, some or all of the steps may be performed by other elements. In addition, some embodiments may perform the steps in parallel, perform the steps in different orders, or perform different steps. Also, it is noted that in one example embodiment the steps and/or modules may be embodied as instructions, e.g., instructions 524, that may be executed by the processor 502 described with respect to FIG. 5.

The security monitor 130 monitors 410 network communications at a loopback interface of a pod in the container system. The pod, such as pod 105, including a service mesh proxy and an application container (e.g., service mesh proxy 110 and application container 115). The application container includes computer-readable instructions, is initiated via a container service, and is isolated using operating system-level virtualization. The service mesh proxy enables features of a service mesh infrastructure of the container system. In addition, the application container communicates with the service mesh proxy using the loopback interface.

The security monitor 130 extracts 420 network address and port information from packet data in the network communications at the loopback interface.

The security monitor 130 determines 430 one or more connection contexts of the network communications at the loopback interface. Each connection context is used to identify a network session of the application container with a remote application container.

Example Machine Architecture

Figure 5:
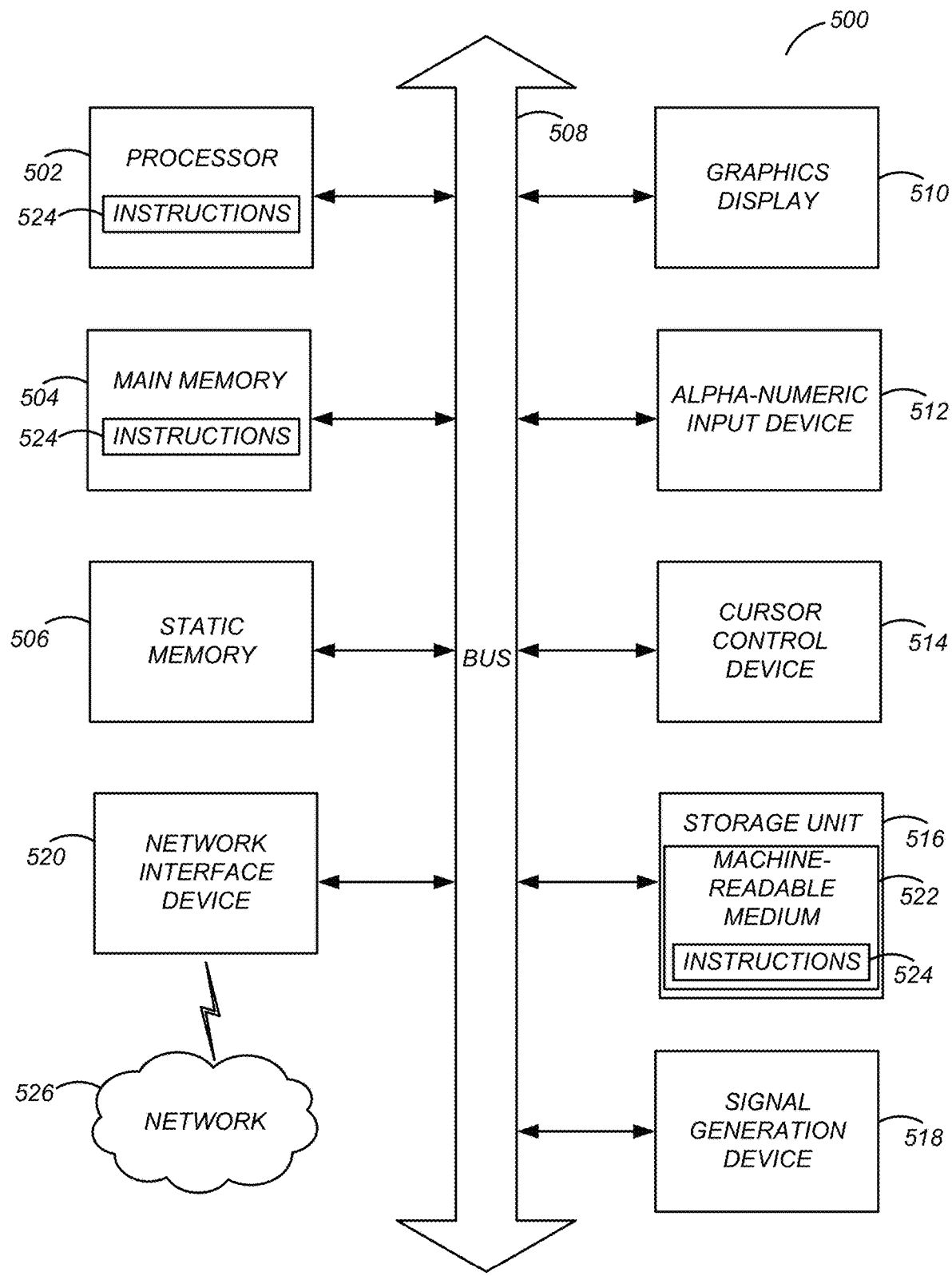
FIG. 5 is a block diagram illustrating components of an example machine able to read instructions from a machine-readable medium and execute them in a processor (or controller).

FIG. 5 is a block diagram illustrating components of an example machine able to read instructions from a machine-readable medium and execute them in a processor (or controller). Specifically, FIG. 5 shows a diagrammatic representation of a machine in the example form of a computer system 500. The computer system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment. The computer system 500 is used to execute the processes and functionality described in FIGS. 1-4.

The machine may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504 and the storage unit 516 communicate via a bus 508.

In addition, the computer system 506 can include a static memory 506, a display driver 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The system as disclosed provides benefits and advantages that include the ability to monitor application containers within a service mesh infrastructure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-5. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors, e.g., 502) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software (e.g., instructions 524) to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 502, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors 502 or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory 504). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for monitoring network communications of application containers in a service mesh infrastructure. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method, comprising:
opening a socket to a loopback interface of an application container, wherein the application container participates in a service mesh and communicates with a plurality of remote application containers in the service mesh via a service mesh proxy associated with the application container;
receiving, through the socket of the loopback interface, a plurality of data packets, the data packets being part of one or more network sessions of the service mesh, at least one of the network sessions is encrypted at the service mesh proxy;
identifying a particular network session of the application container with a particular remote application container through analyzing the plurality of data packets received through the socket; and
monitoring security associated with the particular network session of the service mesh.

2. The computer-implemented method of claim 1, wherein the application container is isolated using operating system-level virtualization.

3. The computer-implemented method of claim 1, wherein the particular network session of the application container is identified based on network address identified from packet data in network communications at the loopback interface.

4. The computer-implemented method of claim 1, wherein the particular network session of the application container is identified based on port information identified from packet data in network communications at the loopback interface.

5. The computer-implemented method of claim 1, further comprising:
extracting a source network address and port information from incoming packet data;
extracting a destination network address and port information from outgoing packet data; and
comparing the source network address and port number of the incoming packet data with the destination network address and port information of outgoing packet data;
identifying packets of the incoming packet data with the source network address and port information matching the destination network address and port information of packets of the outgoing packet data as a set of ingress connection packets; and
determining that the set of ingress connection packets belongs to the particular network session.

6. The computer-implemented method of claim 5, further comprising:
determining that particular network session is an ingress connection by determining that the destination network address and port information indicates a network address of an ethernet interface.

7. The computer-implemented method of claim 6, wherein the application container functions as a server.

8. The computer-implemented method of claim 1, further comprising:
determining whether the application container is coupled to the service mesh proxy by:
determining whether network addresses at an ethernet interface matches network addresses at the loopback interface; and
in response to determining that the network addresses at the ethernet interface do not match the network addresses at the loopback interface, determining that the application container is coupled to the service mesh proxy.

9. The computer-implemented method of claim 1, further comprising:

transmitting a report including information about the particular network session, the report further including a reconstruction of payload data of packet data in the particular network session.

10. A system comprising:
an application container, wherein the application container participates in a service mesh;
a service mesh proxy connected to the application container, wherein the service mesh proxy allows the application container to communicate with a plurality of remote application containers in the service mesh via the service mesh proxy; and
a computing device comprising one or more processors and memory, the memory configured to store computer code comprising instructions, the instructions, when executed by the one or more processors, cause the one or more processors to:
open a socket to a loopback interface of the application container;
receive, through the socket of the loopback interface, a plurality of data packets, the data packets being part of one or more network sessions of the service mesh, at least one of the network sessions is encrypted at the service mesh proxy;
identify a particular network session of the application container with a particular remote application container through analyzing the plurality of data packets received through the socket; and
monitor security associated with the particular network session of the service mesh.

11. The system of claim 10, wherein the application container is isolated using operating system-level virtualization.

12. The system of claim 10, wherein the particular network session of the application container is identified based on network address identified from packet data in network communications at the loopback interface.

13. The system of claim 10, wherein the particular network session of the application container is identified based on port information identified from packet data in network communications at the loopback interface.

14. The system of claim 10, wherein the instructions, when executed by the one or more processors, further cause the one or more processors to:
extract a source network address and port information from incoming packet data;
extract a destination network address and port information from outgoing packet data; and
compare the source network address and port number of the incoming packet data with the destination network address and port information of outgoing packet data;
identify packets of the incoming packet data with the source network address and port information matching the destination network address and port information of packets of the outgoing packet data as a set of ingress connection packets; and
determine that the set of ingress connection packets belongs to the particular network session.

15. The system of claim 14, wherein the instructions, when executed by the one or more processors, further cause the one or more processors to:
determine that particular network session is an ingress connection by determining that the destination network address and port information indicates a network address of an ethernet interface.

16. The system of claim 15, wherein the application container functions as a server.

17. The system of claim 10, wherein the instructions, when executed by the one or more processors, further cause the one or more processors to:
determine whether the application container is coupled to the service mesh proxy by:
determining whether network addresses at an ethernet interface matches network addresses at the loopback interface; and
in response to determining that the network addresses at the ethernet interface do not match the network addresses at the loopback interface, determining that the application container is coupled to the service mesh proxy.

18. The system of claim 10, wherein the application container and the service mesh proxy are stored in the memory of the computing device.

19. A non-transitory computer-readable medium configured to store computer code comprising instructions, the instructions, when executed by one or more processors, cause the one or more processors to:
open a socket to a loopback interface of an application container, wherein the application container participates in a service mesh and communicates with a plurality of remote application containers in the service mesh via a service mesh proxy associated with the application container;
receive, through the socket of the loopback interface, a plurality of data packets, the data packets being part of one or more network sessions of the service mesh, at least one of the network sessions is encrypted at the service mesh proxy;
identify a particular network session of the application container with a particular remote application container through analyzing the plurality of data packets received through the socket; and
monitor security associated with the particular network session of the service mesh.

20. The non-transitory computer-readable medium of claim 19, wherein the particular network session of the application container is identified based on network address identified from packet data in network communications at the loopback interface.

* * * * *